3,155,382
INDEPENDENT FRONT WHEEL SUSPENSION ASSEMBLY

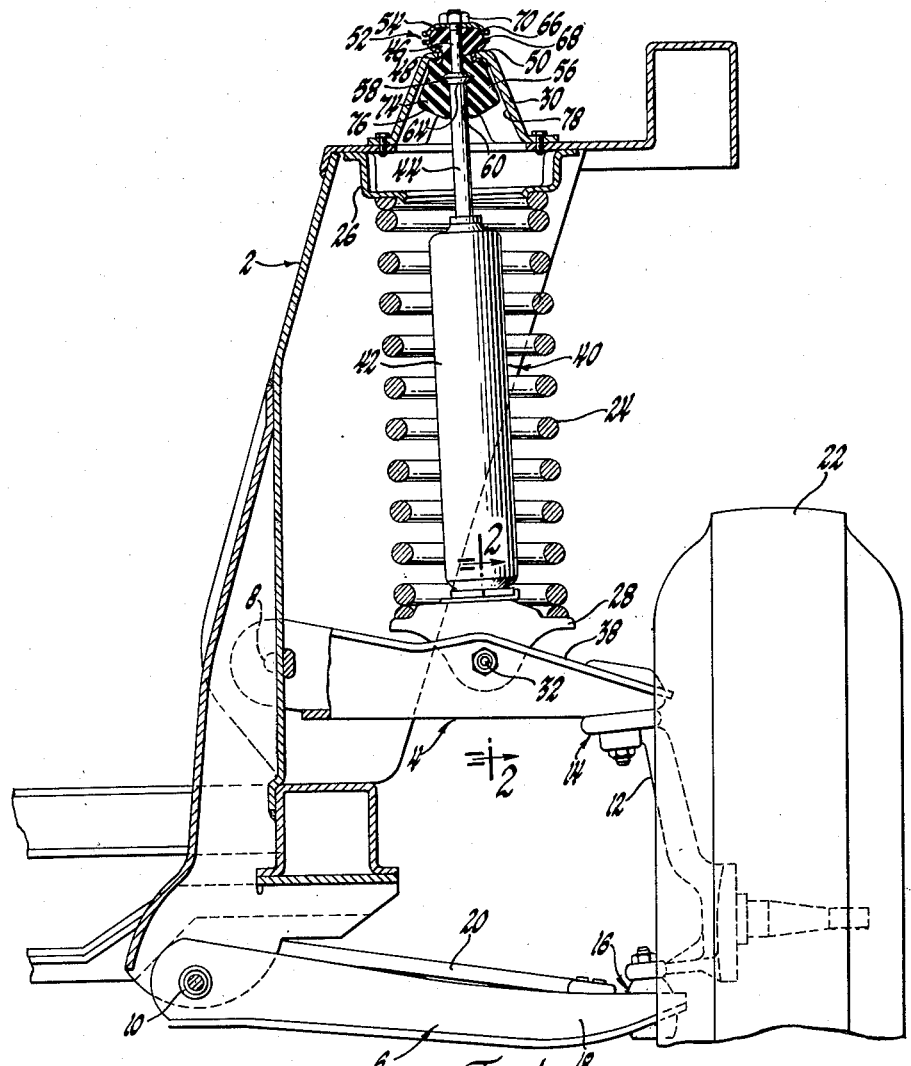

Horacio Shakespear, Troy, Mich., assignor to General Motors Corporation, Detroit, Mich., a corporation of Delaware
Filed Aug. 27, 1962, Ser. No. 219,443
4 Claims. (Cl. 267—8)

This invention relates to dirigible wheel suspension, and more particularly to independent front wheel suspension of the type wherein the load supporting elastic medium is disposed between the upper of a pair of transversely extending wheel control arms and an overhanging outrigger portion of the sprung mass.

In constructions of the type defined it is the practice to mount a coil spring between an upper spring seat rigidly formed on the superstructure and a lower spring seat tiltably mounted on the upper control arm. In such arrangements a telescoping shock absorber extends coaxially of the spring with the upper end of the piston rod resiliently attached to the superstructure, and the lower end of the casing rigidly secured to the lower spring seat so that the latter is caused to remain perpendicular to the telescoping axis of the shock absorber irrespective of the angular inclination of the control arm. With the coil spring disposed in the manner described the problem of location of the usual compression bump stop is more acute than in conventional parallel wishbone suspension due to the lack of any laterally projecting frame structure.

An object of the invention is to provide an improved vehicle suspension.

Another object is to provide an improved parallel wishbone type independent wheel suspension wherein the elastic medium is disposed between the upper control arm and vehicle superstructure.

A further object is to provide a structure of the stated character including a telescoping shock absorber mounted between the upper control arm and superstructure wherein the shock absorber assembly is provided with means for elastic attachment to the superstructure, including a portion effective to establish a compression bump stop for the suspension.

A still further object is to provide a shock absorber assembly including a cylinder and telescoping piston rod, the rod having resilient means associated therewith which serves both as an attachment means and as a means for establishing a resilient stop limiting telescoping movement of the shock absorber in one direction.

These and other objects, advantages and features of the invention will become more fully apparent as reference is had to the accompanying specification and drawing wherein:

FIGURE 1 is a fragmentary rear elevational view, partly in section, illustrating a suspension assembly in accordance with the invention;

FIGURE 2 is an enlarged fragmentary view looking in the direction of arrows 2—2 of FIGURE 1; and FIGURE 3 is a greatly enlarged fragmentary sectional view of a portion of the structure shown in FIGURE 1.

Referring now to the drawing and particularly FIGURE 1, there is shown a suspension construction for one of the usual pairs of dirigible wheels at the front of a vehicle. In the illustrated construction, the reference numeral 2 designates an integral body and frame type superstructure. Extending transversely outwardly from body frame 2 are a pair of vertically spaced wheel control arms 4 and 6, the inboard ends of which are pivotally mounted on generally longitudinally extending pivot shafts 8 and 10, respectively, secured to body frame 2. The outboard ends of arms 4 and 6 in turn are pivotally connected respectively to the upper and lower ends of a generally vertically extending wheel knuckle member 12 by ball joint assemblies 14 and 16. Upper control arm 4 is a unitary "A frame" stamped metal member having longitudinally spaced apart inboard ends, while lower control arm 6 comprises a channel section sheet metal beam 18 and a diagonally disposed strut rod 20, the rear end of which is secured, as by riveting, to beam 18 near its outer end. The forward end of strut 20 is flexibly mounted to body frame 2 forwardly of the inboard end of beam 18 approximately in alignment with the projected axis of shaft 10.

In the illustrated embodiment, the body frame 2 and additional vehicle sprung mass, not shown, is elastically supported relative to wheel 22 by a coil spring 24 which is disposed in compression between an upper spring seat 26 and a lower spring seat 28. Seat 26 is rigidly mounted on body frame 2 in alignment with and below a dome-like member 30, also mounted on body frame 2. Lower spring seat 28 in turn is tiltably mounted on upper control arm 4 intermediate the inboard and outboard ends thereof by a pivot shaft 32 extending between the side walls 34 and 36 of channel portion 38 of arm 4. A telescoping hydraulic shock absorber 40 is disposed concentrically within coil spring 24 with the lower end of the casing or cylinder 42 threadably connected (FIGURE 2) to lower spring seat 28. Shock absorber 40 includes a piston, not shown, reciprocably driven by a piston rod 44 which extends through the upper end of casing 42. At its upper end, rod 44 is formed with a portion 46 of reduced diameter which projects through an aperture 48 formed in the top wall 50 of dome portion 30 and is elastically secured therein by a compression mount assembly 52.

According to the present invention, elastic mount 52 is formed and arranged so as to not only effect connection between the piston rod 44 and the superstructure 2, but in addition to provide a resilient stop defining the limit of compression deflection of the wheel suspension. In the embodiment shown, elastic mount 52 comprises an upper annular elastic member 54 and a lower annular elastic member 56 which are slidably disposed on and surround upper end 46 of rod 44. Members 54 and 56 lie above and below the top wall 50 of dome 30 and overlap a portion of the wall 50 bounding aperture 48. Lower elastic member 56 is generally frusto-conical in cross section to generally conform to the internal configuration of dome portion 30 and is retained on rod 44 in a manner preventing axial movement thereof in a downward direction relative to rod 44 from a predetermined position. As seen best in FIGURE 1, this is accomplished by embedding an annular metal ring 58 coaxial with the bore 60 of member 56 vertically intermediate thereof, which is provided with a bore 62 dimensioned to slidably fit rod portion 46. In assembled position, as seen in FIGURE 3, ring 58 seats on the shoulder 64 formed at the juncture of rod 44 and reduced portion 46. Upper elastic member 54 in turn is slidably disposed over reduced portion 46 and encased between vertically spaced dished sheet metal washers 66 and 68. The terminal end of reduced portion 46 extends upwardly through washer 68 and is threadably engaged by a nut 70 which, in conjunction with ring 58, operates to compressively load all of elastic member 54 and the portion 74 of elastic member 56 above washer 58 against wall 50 of dome 30. Since the threaded connection described exerts compression on the upper portion of member 56 only, it will be evident that the portion 74 of the latter depending below ring 58 is inoperative insofar as retention is concerned. However, upon compression deflection of the suspension to a predetermined extent, the lowermost surface 76 of portion 74 is abuttingly engaged by the upper end of shock absorber casing 42 and is progressively compressively loaded, causing the lower portion 76 to flow radially and engage the inner surface 78 of dome portion 30. In consequence, compression deflection of the suspension is resiliently arrested before the shock absorber assembly reaches its mechanical telescoping limit. Because of the form of elastic member 56 in relation to the shape of dome 30, the former is caused to deflect in both shear and compression, thus affording a more gradual arresting action tending to reduce harshness usually associated with bump stop engagement.

To further reduce harshness, a resilient annular bushing assembly 72 (FIGURE 2) is interposed between lower spring seat 28 and pivot shaft 32.

From the foregoing it is seen that a novel and improved suspension has been provided. The provision of an efficient bump stop is not only simplified, but in addition permits of ready replacement in the event of damage. Further, the usual additional structure to support a separate bump stop directly engageable by the control arm, typical of prior art suspension of the type disclosed, is totally eliminated.

While but one embodiment of the invention has been shown and described, it will be apparent that other changes and modifications may be made therein. It is, therefore, to be understood that it is not intended to limit the invention to the embodiment shown, but only by the scope of claims which follow.

What is claimed is:

1. A vehicle suspension spring assembly comprising, load supporting elastic means disposed between the sprung and unsprung mass of the vehicle, a hydraulic shock absorber arranged concentrically within said load supporting elastic means, said shock absorber including a piston rod flexibly connected to the sprung mass and a cylinder articulatably connected to the unsprung mass, means forming an apertured wall in said sprung mass through which said rod extends, a pair of annular elastomeric bodies surrounding said rod at opposite sides of said apertured wall, one of said bodies including a lower portion engageable by said cylinder upon predetermined compression deflection of said load supporting elastic means, and means including shoulder means on said rod for compressively loading the upper portion of said one body and all of the other body to elastically secure said rod to said sprung mass, the lower surface of said one body extending substantially below said shoulder means on said rod.

2. A vehicle suspension spring assembly comprising, load supporting elastic means disposed between the sprung and unsprung mass of the vehicle, a hydraulic shock absorber arranged concentrically within said load supporting elastic means, said shock absorber including a piston rod flexibly connected to the sprung mass and a cylinder articulatably connected to the unsprung mass, said piston rod having a shoulder means formed thereon, means forming an apertured wall in said sprung mass through which said rod extends, a pair of annular elastomeric bodies surrounding said rod at opposite sides of said apertured wall, one of said bodies including an integral lower portion extending substantially below said shoulder means and engageable by said cylinder upon predetermined compression deflection of said load supporting elastic means, and means including said shoulder means for compressively loading the upper portion of said one body and all of the other body to elastically secure said rod to said sprung mass.

3. A vehicle suspension spring assembly comprising, load supporting elastic means disposed between the sprung and unsprung mass of the vehicle, a telescoping hydraulic shock absorber arranged concentrically within said load supporting elastic means, said shock absorber including a piston rod flexibly connected to the sprung mass and a cylinder articulatably connected to the unsprung mass, means forming an apertured wall in said sprung mass through which said rod extends, a pair of annular elastomeric bodies surrounding said rod and disposed, respectively, above and below said apertured wall, the lower of said bodies including an enlarged depending portion engageable by one end of said cylinder upon predetermined compression deflection of said load supporting elastic means, and means associated with said rod for compressively loading the upper portion of said lower body and all of the upper body to elastically secure said rod to said sprung mass, said enlarged depending portion of the lower of said bodies extending beyond said means associated with said rod.

4. In a vehicle suspension including a sprung and unsprung mass, a shock absorber assembly operatively connected between said sprung and unsprung mass, said assembly including the piston rod secured by elastic means through said sprung mass, said elastic means including axially abutting rubber bodies surrounding said rod, means associated with said rod for compressively loading all of one body and a portion of the other body to elastically secure said rod to said sprung mass, the remaining portion of the other body extending beyond said means associated with said rod and being formed and arranged for engagement by said cylinder upon predetermined compression deflection of said load supporting elastic means.

References Cited in the file of this patent

UNITED STATES PATENTS

| | | |
|---|---|---|
| 2,314,505 | McIntyre | Mar. 23, 1943 |
| 2,653,681 | McIntyre | Sept. 29, 1953 |
| 2,933,328 | McIntyre | Apr. 19, 1960 |
| 3,046,000 | Polhemus | July 24, 1962 |
| 3,075,787 | Mineck | Jan. 29, 1963 |